(12) United States Patent
Meyers et al.

(10) Patent No.: US 8,495,145 B2
(45) Date of Patent: Jul. 23, 2013

(54) CONTROLLING RECEIPT OF UNDESIRED ELECTRONIC MAIL

(75) Inventors: Don Meyers, Rescue, CA (US); Robert Johnson, El Dorado Hills, CA (US); Hong Li, El Dorado Hills, CA (US)

(73) Assignee: Intel Corporation, Santa Clara, CA (US)

( * ) Notice: Subject to any disclaimer, the term of this patent is extended or adjusted under 35 U.S.C. 154(b) by 1434 days.

(21) Appl. No.: 10/965,170

(22) Filed: Oct. 14, 2004

(65) Prior Publication Data
US 2006/0085506 A1    Apr. 20, 2006

(51) Int. Cl.
G06F 15/16    (2006.01)
G06F 15/173    (2006.01)

(52) U.S. Cl.
USPC .......................... 709/206; 709/204; 709/223

(58) Field of Classification Search
USPC .......................................................... 709/206
See application file for complete search history.

(56) References Cited

U.S. PATENT DOCUMENTS

| | | | | |
|---|---|---|---|---|
| 5,774,689 A | * | 6/1998 | Curtis et al. | 703/21 |
| 5,918,017 A | * | 6/1999 | Attanasio et al. | 709/224 |
| 5,933,412 A | * | 8/1999 | Choudhury et al. | 370/218 |
| 5,983,278 A | * | 11/1999 | Chong et al. | 709/235 |
| 6,047,326 A | * | 4/2000 | Kilkki | 709/228 |
| 6,163,808 A | * | 12/2000 | Kilkki | 709/233 |
| 6,581,092 B1 | * | 6/2003 | Motoyama et al. | 709/219 |
| 6,657,954 B1 | * | 12/2003 | Bird et al. | 370/229 |
| 6,760,848 B1 | * | 7/2004 | Culca | 713/300 |
| 6,799,276 B1 | * | 9/2004 | Belissent | 726/14 |
| 6,973,555 B2 | * | 12/2005 | Fujiwara et al. | 711/170 |
| 7,054,902 B2 | * | 5/2006 | Toporek et al. | 709/203 |
| 7,487,212 B2 | * | 2/2009 | Taylor | 709/206 |
| 7,849,142 B2 | * | 12/2010 | Clegg et al. | 709/206 |
| 2003/0050988 A1 | * | 3/2003 | Kucherawy | 709/207 |
| 2003/0069933 A1 | * | 4/2003 | Lim et al. | 709/206 |
| 2003/0079022 A1 | | 4/2003 | Toporek et al. | |
| 2003/0135573 A1 | * | 7/2003 | Taylor | 709/207 |
| 2003/0158905 A1 | * | 8/2003 | Petry et al. | 709/206 |
| 2003/0187996 A1 | | 10/2003 | Cardina et al. | |

(Continued)

FOREIGN PATENT DOCUMENTS

| EP | 1 560 384 | 8/2005 |
|---|---|---|
| EP | 1560384 | 8/2005 |

(Continued)

OTHER PUBLICATIONS

UK Intellectual Property Office, Examination Report for British Application No. GB0705906.6, 5 pages, Sep. 10, 2008.

(Continued)

*Primary Examiner* — Guang Li
(74) *Attorney, Agent, or Firm* — Trop, Pruner & Hu, P.C.

(57) ABSTRACT

Spam and other unwanted electronic-mail may be controlled by a system in which a given external message transfer agent using a given Internet protocol address and a given domain name is limited in the number of connections that it may make and the number of messages it may deliver over a given time period. Based on the performance of that external message transfer agent, the passage of time and the number of connections, its assigned connection limit may be increased so that progressively trust is increased and more message connections and a higher number of messages delivered may be permitted.

20 Claims, 3 Drawing Sheets

U.S. PATENT DOCUMENTS

| | | | |
|---|---|---|---|
| 2003/0229671 A1* | 12/2003 | Kadomatsu et al. | 709/206 |
| 2004/0024859 A1* | 2/2004 | Bloch et al. | 709/223 |
| 2004/0088413 A1* | 5/2004 | Bhogi et al. | 709/226 |
| 2004/0133691 A1* | 7/2004 | Shimada | 709/229 |
| 2004/0199585 A1* | 10/2004 | Wang | 709/206 |
| 2004/0199592 A1* | 10/2004 | Gould et al. | 709/206 |
| 2005/0010644 A1* | 1/2005 | Brown et al. | 709/206 |
| 2006/0031359 A1* | 2/2006 | Clegg et al. | 709/206 |

FOREIGN PATENT DOCUMENTS

| | | |
|---|---|---|
| JP | 2000-163341 | 6/2000 |
| JP | 2003-169095 | 6/2003 |
| JP | 2003-196217 | 7/2003 |
| JP | 2003-234784 | 8/2003 |
| JP | 2004-015720 | 1/2004 |
| JP | 2004-172891 | 6/2004 |
| WO | WO 01/16695 | 3/2001 |
| WO | WO 03/071390 | 8/2003 |

OTHER PUBLICATIONS

Japanese Patent Office, Office Action issued in Japanese Application No. 2007-536956, dated Aug. 4, 2009, 7 pages.

German Patent Office, Examination Report for DE Application No. 11 2005 002 429.6-31 (with English translation), dated Jul. 15, 2010, 11 pgs.

Office Action dated Apr. 20, 2011 issued by the Chinese Patent Office in corresponding Application No. 2005-80033156.9 (10 pages).

Office Action dated Jul. 19, 2011 issued by the Japanese Patent Office in corresponding Application No. 2007-536956 (6 pages).

\* cited by examiner

CONTROLLING RECEIPT OF UNDESIRED ELECTRONIC MAIL

BACKGROUND

This invention relates generally to systems for electronic mail delivery.

Message transfer agents are programs responsible for delivering electronic mail messages. Upon receiving a message, a message transfer agent stores the message locally, analyzes its recipients, and either delivers the message locally or routes it to another message transfer agent. In either case, the message transfer agent may add or edit the message header.

The prevalence of undesired electronic mail messages or spam has hindered the entire system of electronic messaging. Many users find that they receive so much undesired electronic mail that it is difficult to sort through and find the desired mail. Systems are available that check for certain key words and quarantine messages with those key words. However, despite the existing techniques for controlling spam, spam continues to be a major problem in electronic mail systems.

Thus, there is a need for better ways for controlling undesired electronic mail.

DETAILED DESCRIPTION

Figure 1:
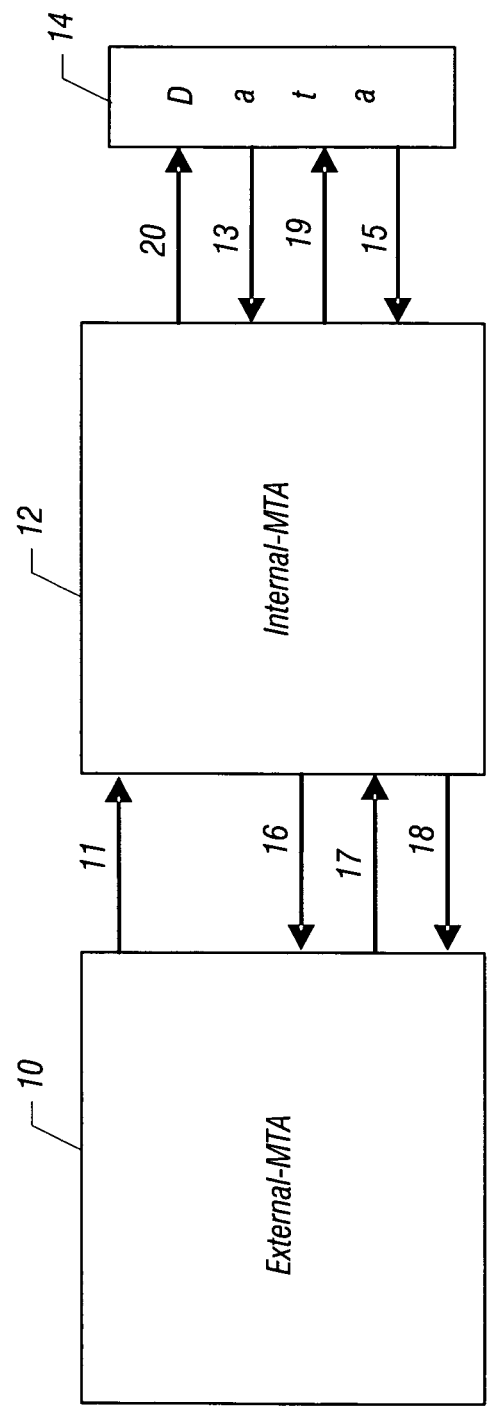
FIG. 1 is a schematic depiction of a transfer of an electronic mail message.

Referring to FIG. 1, an external message transfer agent (MTA) 10 may attempt to transmit an electronic mail message to a receiver having an internal message transfer agent (MTA) 12. The internal message transfer agent 12 also communicates with a database 14.

Thus, initially, the external MTA 10 uses a particular Internet protocol address to request a connection to the internal MTA 12 as indicated at 11. The internal MTA 12 looks up the trust value for the external MTA 10 using the fully qualified domain name of the external MTA 10, the Internet protocol address of the MTA 10, and the domain that it is using to make the connection. This trust value check is indicated by the arrow 20 as a communication from the internal MTA 12 to the database 14. The database 14 then indicates (in this specific example) that a trust value does or does not exist as indicated by arrow 13. If there is no connection history then a default value may be used. A connection history entry may be logged to keep track of the number of times that a given external MTA, using a particular Internet protocol address and domain, has attempted to access the internal MTA 12.

The internal MTA 12 then sends a communication back to the database 14, as indicated by arrow 19, to see if the message delivery threshold has been exceeded for the external MTA 10. Each external MTA 10 is assigned a dynamic message delivery threshold which indicates the number of times for a given trust value, that accesses can be made to the internal MTA 12. The better the experience with a particular external MTA, the progressively higher is its assigned trust value and the greater the message delivery threshold that must be exceeded before connection limitations are imposed.

The message delivery threshold, in this case, may or may not be exceeded and is communicated from the database 14 to the internal MTA 12. If the threshold has not been exceeded, the internal MTA 12 accepts the connection and if it has been exceeded, other action may be taken. Thus, as indicated by arrow 16, the connection acceptance (or rejection) is communicated to the external MTA 10. The external MTA 10, if the connection is accepted, begins transmitting messages, as indicated by arrow 17, to the internal MTA 12.

The internal MTA 12 continues to track the messages received over time from the MTA 10. Then, as indicated by arrow 18, the internal MTA 12 determines that the message delivery threshold has been exceeded and, for example, drops the connection to the external MTA 10 with a temporary error code indicating to retry at a later time.

As another example, a dialog may occur in which the external MTA 10 attempts to retry a connection after a threshold has been exceeded and the connection was refused. The external MTA 10 uses its same Internet protocol address to request another connection to the internal MTA 12, again, using the same domain name. The internal MTA 12 looks up the trust value for that external MTA 10. Again, a trust value exists and a connection history entry is logged. The internal MTA 12 checks to see if the message delivery threshold has been exceeded for the external MTA 10. Of course, the message delivery threshold has already been exceeded, so the internal MTA drops the connection to the external MTA 10 with a temporary error code, again, indicating to retry at a sufficiently later time.

As still another example, a communication dialog may occur when the external MTA 10 retries a connection after the threshold has been exceeded, and the connection is accepted again, but eventually the message delivery threshold is exceeded again. In this case, the external MTA 10 uses the same Internet protocol address and domain name to again request a connection to the internal MTA 12. The internal MTA 12 looks up the trust value for the external MTA 10 using the fully qualified domain name of the external MTA 10, its Internet protocol address, and the domain it is connecting as. Again, a trust value exists and a connection history entry is logged. The internal MTA 10 checks to see if the message delivery threshold has been exceeded for the external MTA 10 and determines that sufficient time has now elapsed since the last rejected connection, that the threshold has not been exceeded. Then, the connection is accepted and messages are received from the external MTA 10. Those messages are tracked as received over time. Eventually, the internal MTA 12 determines that the message delivery threshold has been exceeded and drops the connection to the external MTA 10 with the corresponding error code.

As another example, the trust level may change over time and have an effect on mail delivery. In this case, a time interval has passed with a particular external MTA 10 successfully communicating with the internal MTA 12, allowing the trust level to increase for the external MTA 10, using a given IP address and domain name. Thus, sufficient time has gone by without any problems occurring so that a new, higher level of trust has been reached and a new trust level is assigned. This new trust level allows more messages to be delivered during an allotted time interval.

To implement this new level, the external MTA 10 again requests a connection. The internal MTA 12 looks up the trust value for the external MTA using its domain name and Internet protocol address and its connecting domain. The new trust value is used to assign a higher message delivery threshold and a connection history entry is logged. The internal MTA 12 checks to see if the new message delivery threshold has been exceeded for the external MTA 10. Since it has not been exceeded, the internal MTA 12 accepts the connection. Messages are transmitted from the external MTA 10 to the internal MTA 12 and those messages are tracked as received over a time. An increased message delivery rate may be allowed based on the new trust level. Eventually, the internal MTA 12 determines that the message delivery threshold has been exceeded, drops the connection, and issues a temporary error code indicating to retry at a later time.

As yet another example, the trust level may be influenced by a so-called outside trust influencer. Examples of outside trust influencers may be ratings assigned by rating agencies, white lists, or information received from others about the trust value of a given external MTA 10. In this case, an outside trust influencer may use spam history or other data to determine that the trust value for a given MTA should be changed. For example, the outside trust influencer may determine that the external MTA 10 is a known spamer. This would lower its trust value. New inquiries for the trust value for the external MTA 10 return the new trust value. In other words, the database 14 may be loaded with new data from external sources other than the actual history of transactions between the external MTA 10 and the internal MTA 12.

Thus, it can be appreciated that generally until the internal MTA 12 gets to "know" an external MTA 10, the MTA 12 limits the number and frequency with which the MTA 10 may make connections. The internal MTA 12 uses a form of trust based on past history and potentially outside influencers to assume a degree of trust. Any time a new domain attempts an inbound communication, it must pay a price of message delay by incurring a limit on the number and rate at which the new domain can send messages to the internal MTA 12. New external MTAs for a known domain may also incur a penalty message delay by having a limit on the rate at which they can send messages to the MTA 12.

Over time, the longer the domain exists and the longer the external MTA retains the same name and address, the more it is trusted. Therefore, the receiving system will be willing to accept more mail from a given external MTA.

Figure 2:
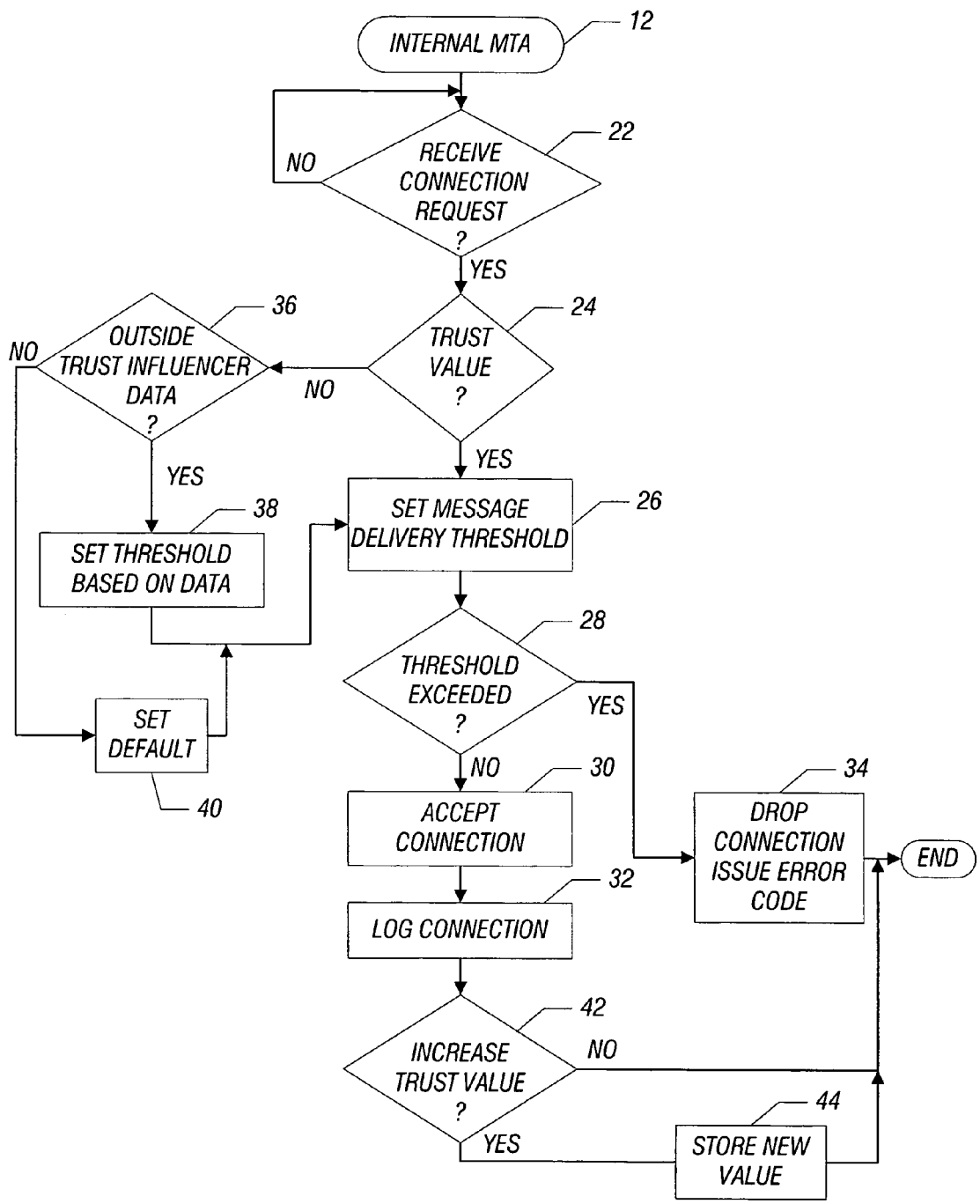
FIG. 2 is a flow chart for software in accordance with one embodiment of the present invention.

Thus, referring to FIG. 2, the internal MTA software 12 begins by receiving a connection request as indicated at diamond 22. The internal MTA 12 checks to determine what is the trust value of the connecting external MTA as indicated at diamond 24. If there is a trust value, a message delivery threshold is set as indicated at block 26. Then, in the course of communications with the external MTA, the internal MTA checks to determine whether the message delivery threshold has been exceeded at diamond 28. As long as it is not exceeded, new connections may be accepted, as indicated in block 30, but those connections and the messages transmitted are logged, as indicated at 32, and counted. This count of connections and messages is used to determine when the number of connections and/or the rate of connection and message threshold is exceeded in diamond 28. When the threshold is exceeded, the connection may be dropped and an error code is issued as indicated in block 34.

If there is no trust value, a check may be made to determine whether outside trust influencer data exists as indicated at diamond 36. If so, the threshold may be set on that data and that data may be further stored in the database 14 as indicated in block 38. If there is no outside influencer data then a default value may be set as indicated at block 40. Presumably, the default value will allow a relatively limited number of connections or messages over time, but the value may be increased based on performance and time.

After the connection is logged, a check at diamond 42 determines whether the trust value should be increased based on the connection history. If a sufficient number of connections have been made by a given external MTA using the same Internet protocol address and the same domain name without any problems, then the trust value may be increased, allowing a higher number of messages to be transmitted before the message delivery threshold is reached. The new threshold value may then be stored as indicated in block 44.

Figure 3:
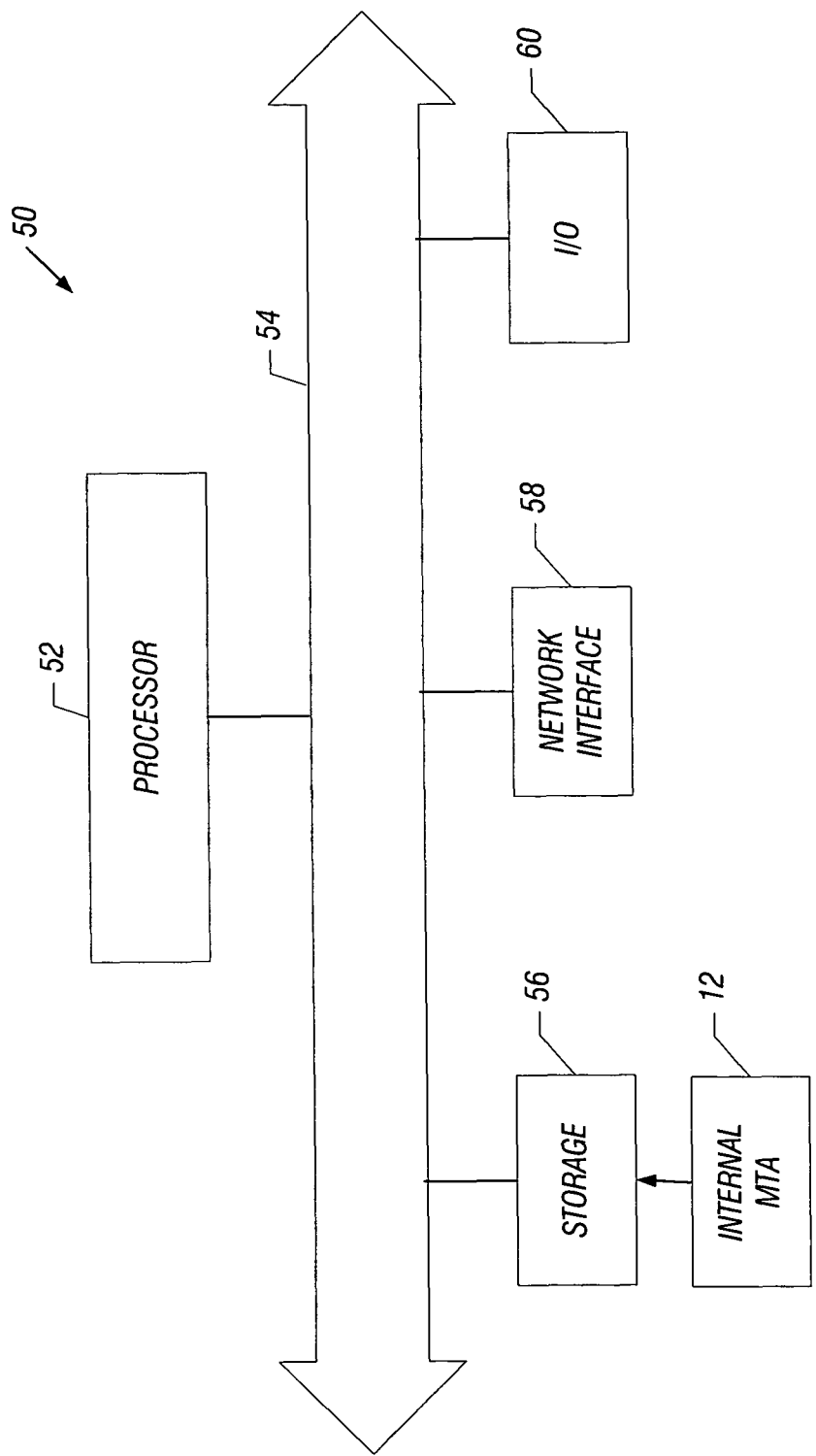
FIG. 3 is a system depiction of an electronic mail transmitter or receiver in accordance with one embodiment of the present invention.

Referring to FIG. 3, a receiving processor-based system 50 may include a processor 52 coupled by a bus 54 to conventional components, such as a network interface 58 such as a wireless interface, and an input/output (I/O) interface 60. A storage 56, such as a hard disk drive, semiconductor memory, or other memory, may store the internal MTA software 12. In one embodiment of the present invention, the storage 56 may be a flash memory.

Some embodiments of the present invention may be effective against hit and run tactics because they use time and past success to establish a basic form of trust. Some embodiments may not need any other infrastructure support. In addition, some embodiments may develop a list of records that is dynamic and, therefore, contains less waste records. Legitimate message transfer agents are not severely punished because the algorithm allows decaying levels of punishment over time. Once the MTA becomes trusted, all senders using the MTA may benefit from that trust. Some embodiments may reward stability. If an MTA exists for a certain long time with a consistent name and Internet protocol address, it continues to get consistently higher levels of trust without penalty. Some embodiments of the present invention may work with other outside influencers to accelerate decision making. In some embodiments, to prevent a small number of spam messages from being delivered to a very large distribution list, a receiving MTA may count each recipient as a separate message delivery and the count of messages allowed within a given time period. In some embodiments, to prevent very large unwanted messages from loading the system, a receiving MTA may count the size of the delivered messages and limit the amount of data received within a given time period.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. A method comprising:
   authorizing a given message transfer agent to make a given maximum number of connections and deliver a given number of messages within a time period;
   determining when the given maximum number of connections has been completed and the given number of messages delivered;
   if so, determining whether a given time period has elapsed since the given number of connections has been completed and the given number of messages delivered;
   accepting a new connection request from said given message transfer agent if the time period has elapsed; and
   otherwise, dropping the connection request to an external message transfer agent and issuing a temporary error code indicating to retry at a sufficiently later time.

2. The method of claim 1 including receiving information to adjust the given number of times within a time period that the given message transfer agent is able to connect.

3. The method of claim 1 including authorizing the given message transfer agent to complete a given rate of connections over a given period of time.

4. The method of claim 1 including logging each connection from the given message transfer agent.

5. The method of claim 1 including blocking messages of a given size from said message transfer agent.

6. The method of claim 1 including counting a message directed to a plurality of recipients as a separate message to each recipient and using said count to determine whether a message threshold has been reached.

7. A non-transitory computer readable medium storing instructions that, when executed, enable a processor-based device to:
   authorize a given message transfer agent to make a given maximum number of connections and deliver a given number of messages within a time period;
   determine when the given maximum number of connections has been completed and the given number of messages delivered;
   if so, determine whether a given time period has elapsed since the given number of connections has been completed and the given number of messages delivered;
   accept a new connection request from said given message transfer agent if the time period has elapsed; and
   otherwise, drop the connection request to an external message transfer agent and issuing a temporary error code indicating to retry at a sufficiently later time.

8. The medium of claim 7 further storing instructions that, if executed, enable the processor-based device to receive information to adjust the given number of times within a time period that a given message transfer agent is able to connect.

9. The medium of claim 7 further storing instructions that, if executed, enable the processor-based device to authorize the given message transfer agent to complete a given rate of connections over a given period of time.

10. The medium of claim 7 further storing instructions that, if executed, enable the processor-based device to log each connection from the given message transfer agent.

11. The medium of claim 7 further storing instructions that, if executed, enable the processor-based device to drop the connection to an external message transfer agent and issue the temporary error code indicating to retry at the sufficiently later time when the given number of connections has been exceeded.

12. The medium of claim 7 further storing instructions that, if executed, enable the processor-based device to block messages of a given size from said message transfer agent.

13. The medium of claim 7 further storing instructions that, if executed, enable the processor-based device to count a message directed to a plurality of recipients as a separate message to each such recipient and use said count to determine whether a message threshold has been reached.

14. A processor-based device comprising:
   a controller;
   a storage, coupled to said controller, storing instructions that, if executed, enable the processor-based device to authorize a given message transfer agent to make a given maximum number of connections and deliver a given number of messages within a time period, determine when the given maximum number of connections has been completed and the given number of messages delivered, and if so, determine whether a given time period has elapsed since the given number of connections has been completed and the given number of messages delivered, accept a new connection request from said given message transfer agent if the time period has elapsed, and otherwise, drop the connection request to an external message transfer agent and issuing a temporary error code indicating to retry at a sufficiently later time; and
   a wireless interface coupled to said controller.

15. The device of claim 14, said storage storing instructions that, if executed, enable the system to receive information to adjust the given number of times within a time period that a given message transfer agent is able to connect.

16. The device of claim 14, said storage further storing instructions that, if executed, enable the system to authorize the given message transfer agent to complete a given rate of connections over a given period of time.

17. The device of claim 14, said storage storing instructions that, if executed, enable the system to log each connection from the given message transfer agent.

18. The device of claim 14, said storage storing instructions that, if executed, enable the system to drop the connection to an external message transfer agent and issue the temporary error code indicating to retry at the sufficiently later time when the given number of connections has been exceeded.

19. The device of claim 14, said storage further storing instructions that, if executed, enable the system to block messages of a given size from said message transfer agent.

20. The device of claim 14, said storage storing instructions that, if executed, enable the system to count a message directed to a plurality of recipients as a separate message to each recipient and use said count to determine whether a message threshold as been reached.

\* \* \* \* \*